United States Patent [19]
Cullen

[11] Patent Number: 5,313,768
[45] Date of Patent: May 24, 1994

[54] AGRICULTURAL BAGGING MACHINE

[76] Inventor: Steven R. Cullen, P.O. Box 642, Astoria, Oreg. 97103

[21] Appl. No.: 7,506

[22] Filed: Jan. 22, 1993

Related U.S. Application Data

[63] Continuation of Ser. No. 815,942, Dec. 30, 1991, abandoned.

[51] Int. Cl.$^5$ .............................................. B65B 43/26
[52] U.S. Cl. .......................................... 53/570; 53/259
[58] Field of Search ...................... 53/259, 284.7, 529, 53/567, 570, 576, 577; 141/73, 80, 114

[56] References Cited

U.S. PATENT DOCUMENTS

| | | | |
|---|---|---|---|
| 2,646,913 | 7/1953 | Goldberg et al. | 226/45 |
| 3,687,061 | 8/1972 | Eggenmuller et al. | 100/65 |
| 4,046,068 | 9/1977 | Eggenmuller et al. | 100/65 |
| 4,256,031 | 3/1981 | Ryan | 100/65 |
| 4,337,805 | 7/1982 | Johnson et al. | 141/71 |
| 4,567,820 | 2/1986 | Munsell | 100/65 |
| 4,724,876 | 2/1988 | Ryan | 141/114 |
| 4,949,633 | 8/1990 | Johnson et al. | 100/65 |

Primary Examiner—John Sipos
Assistant Examiner—Linda B. Johnson
Attorney, Agent, or Firm—Zarley, McKee, Thomte, Voorhees & Sease

[57] ABSTRACT

Agricultural Bagging Machine including a vertically disposed chain feeder positioned above the rotor thereof to move silage downwardly into contact with the rotor. The chain feeder comprises a pair of chain feeder conveyors positioned in a side-by-side relationship.

3 Claims, 3 Drawing Sheets

AGRICULTURAL BAGGING MACHINE

This is a continuation of copending application Ser. No. 07/815,942 filed on Dec. 30, 1991 now abandoned.

BACKGROUND OF THE INVENTION

This invention relates to an agricultural bagging machine and, more particularly, to an agricultural bagging machine having a vertically disposed chain feeder positioned above the rotor thereof.

Agricultural bagging machines have been employed for several years to bag or pack silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. In the prior art devices, the silage tends to bridge or clog in the hopper or intake end of the bagging machine. U.S. Pat. No. 4,337,805 discloses a beater bar feeder arrangement for supplying the silage to the rotor and which is intended to prevent bridging or clogging of the silage in the hopper.

In the beater bar arrangement such as disclosed in U.S. Pat. No. 4,337,805, a dangerous hazard is present due to the projections or arms extending from the beater bar shaft. Further, the rotating beater bar of U.S. Pat. No. 4,337,805 tends to throw silage particles into the air, making for a dusty condition.

It is therefore a principal object of the invention to provide an improved agricultural bagging machine.

Yet another object of the invention is to provide an agricultural bagging machine having a vertically disposed chain feeder positioned above the rotor of the machine for conveying silage to the rotor.

Still another object of the invention is to provide an agricultural bagging machine having a vertical chain feeder which provides a more efficient delivery of silage to the rotor.

Still another object of the invention is to provide an agricultural bagging machine which eliminates the dusty conditions normally associated with beater bar feeders in prior art agricultural bagging machines.

Yet another object of the invention is to provide an agricultural bagging machine which is economical to manufacture, durable in use and refined in appearance.

These and other objects of the invention will be apparent to those skilled in the art.

SUMMARY OF THE INVENTION

An improved agricultural bagging machine is disclosed wherein a vertically disposed chain feeder is positioned above the rotor of the machine to move silage downwardly into contact with the rotor in a more efficient and safer manner than in the prior art devices. The chain feeder of this invention comprises a pair of chain feeder conveyors positioned side-by-side. The movement of the chain feeders causes the silage or the like to move downwardly into contact with the rotor so that the rotor may efficiently force the silage or the like into the tunnel of the machine for placement in the agricultural bag.

DESCRIPTION OF THE PREFERRED EMBODIMENT

Figure 1:
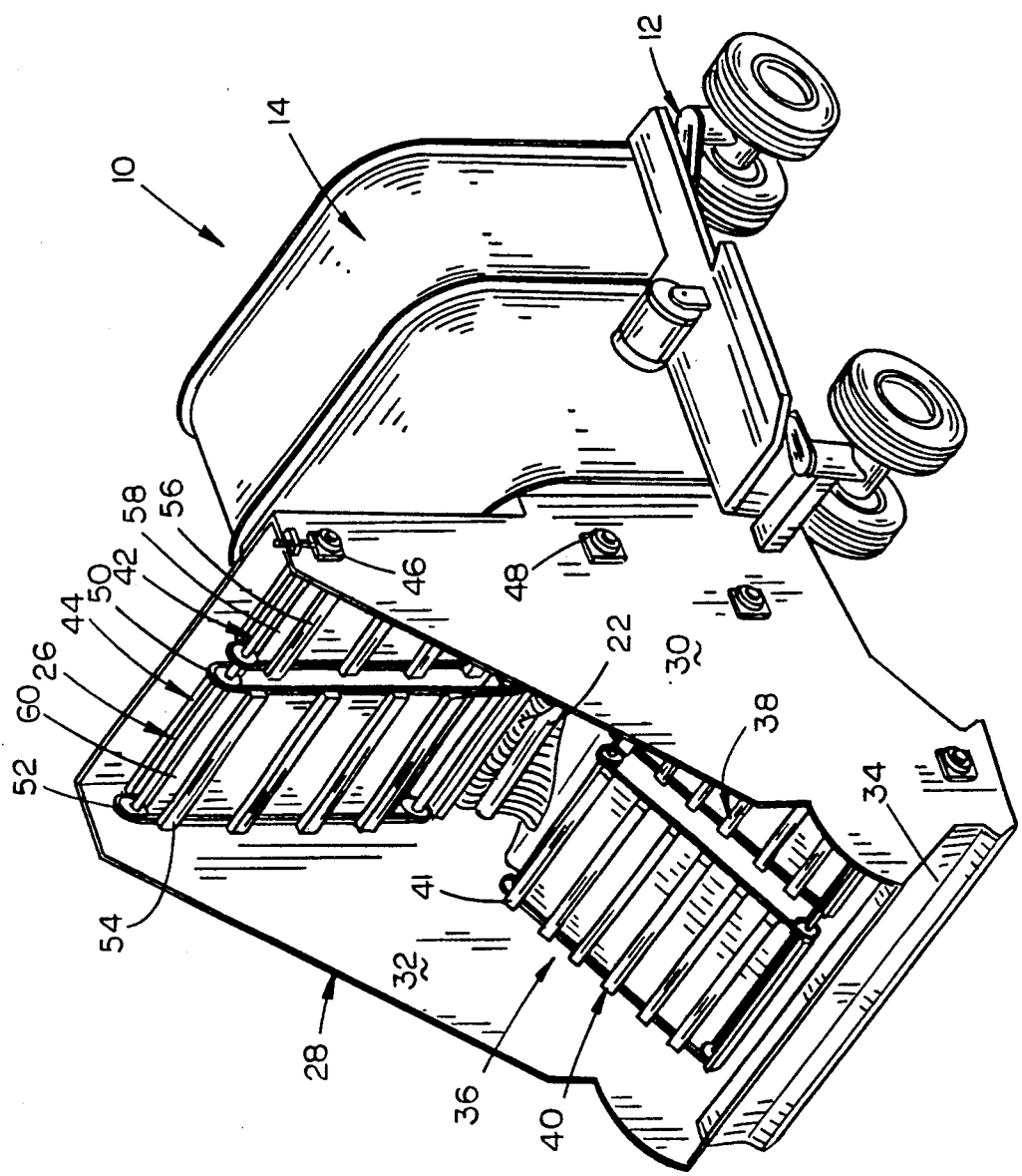
FIG. 1 is a front perspective view of the agricultural bagging machine of this invention.
Figure 2:
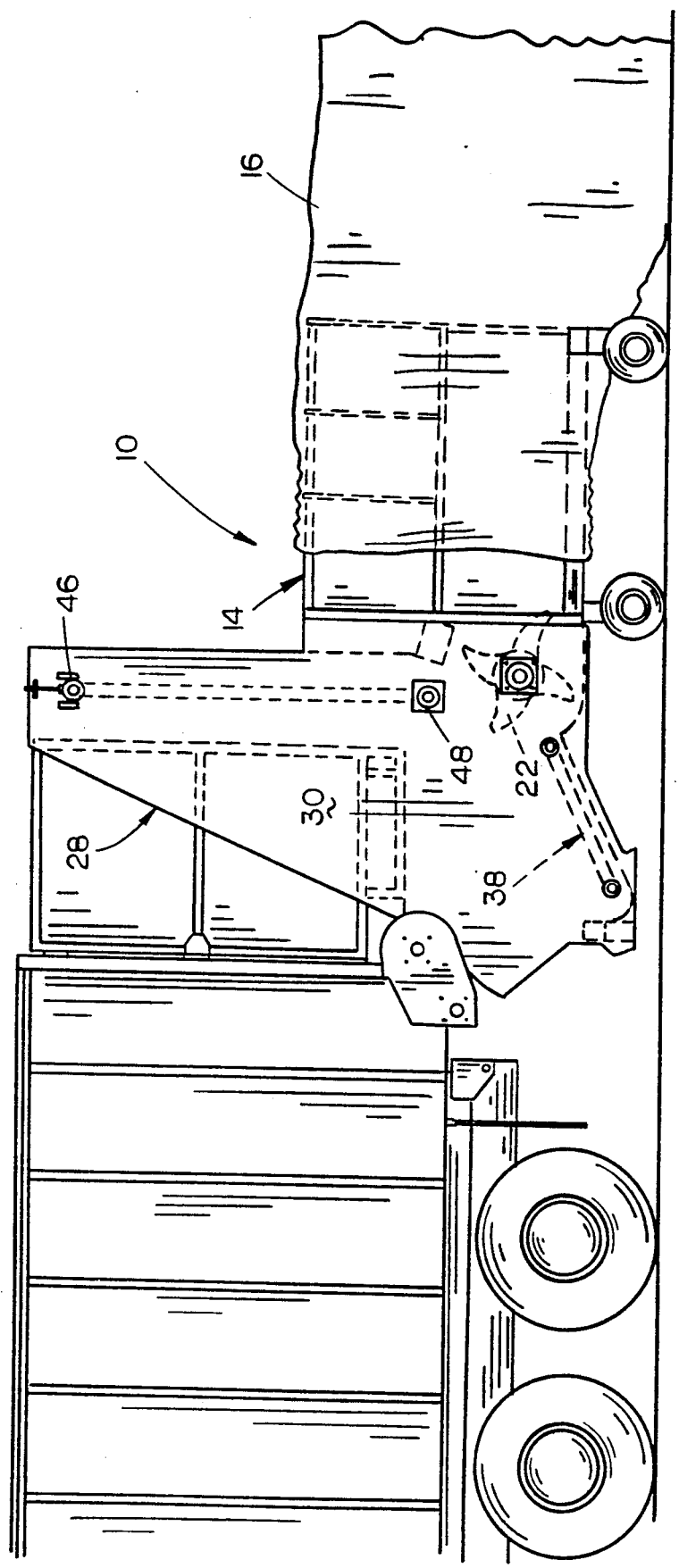
FIG. 2 is a side elevational view of the bagging machine of this invention.

The agricultural bagging machine of this invention is referred to generally by the reference numeral 10. Machine 10 includes a wheeled frame means 12 having a tunnel 14 mounted thereon upon which is normally positioned the open mouth of an agricultural bag 16 as illustrated in FIG. 2. For purposes of conciseness, the power means for driving the various components on the machine have not been disclosed since the same does not form a part of the invention.

Machine 10 includes a face plate 18 at the forward end of the tunnel 14 which defines an opening or passageway 20 at the inlet of the tunnel 14. A conventional rotor 22 is rotatably mounted in the passageway 20 and is rotated in a counterclockwise fashion viewed in FIG. 3 to force silage 24 or the like through the tunnel 14 and into the bag 16 in conventional fashion.

The invention disclosed herein departs from the conventional bagging machines in that a novel vertically disposed chain feeder 26 is provided at the rearward end of the hopper or feed table 28. Hopper or feed table 28 is defined by opposite sides 30 and 32 and a table nose 34 at the lower forward end thereof adapted to push unloading trucks. An inclined chain table 36 is mounted in the hopper 28 and comprises a pair of feeder chain assemblies 38 and 40. Each of the feeder chain assemblies 38 and 40 includes a pair of oppositely disposed chain members having slats 41 extending therebetween. The silage positioned on the feed table 36 is fed to the rotating rotor 22 so that the rotor 22 may convey the silage into the interior of the tunnel 14.

Figure 3:
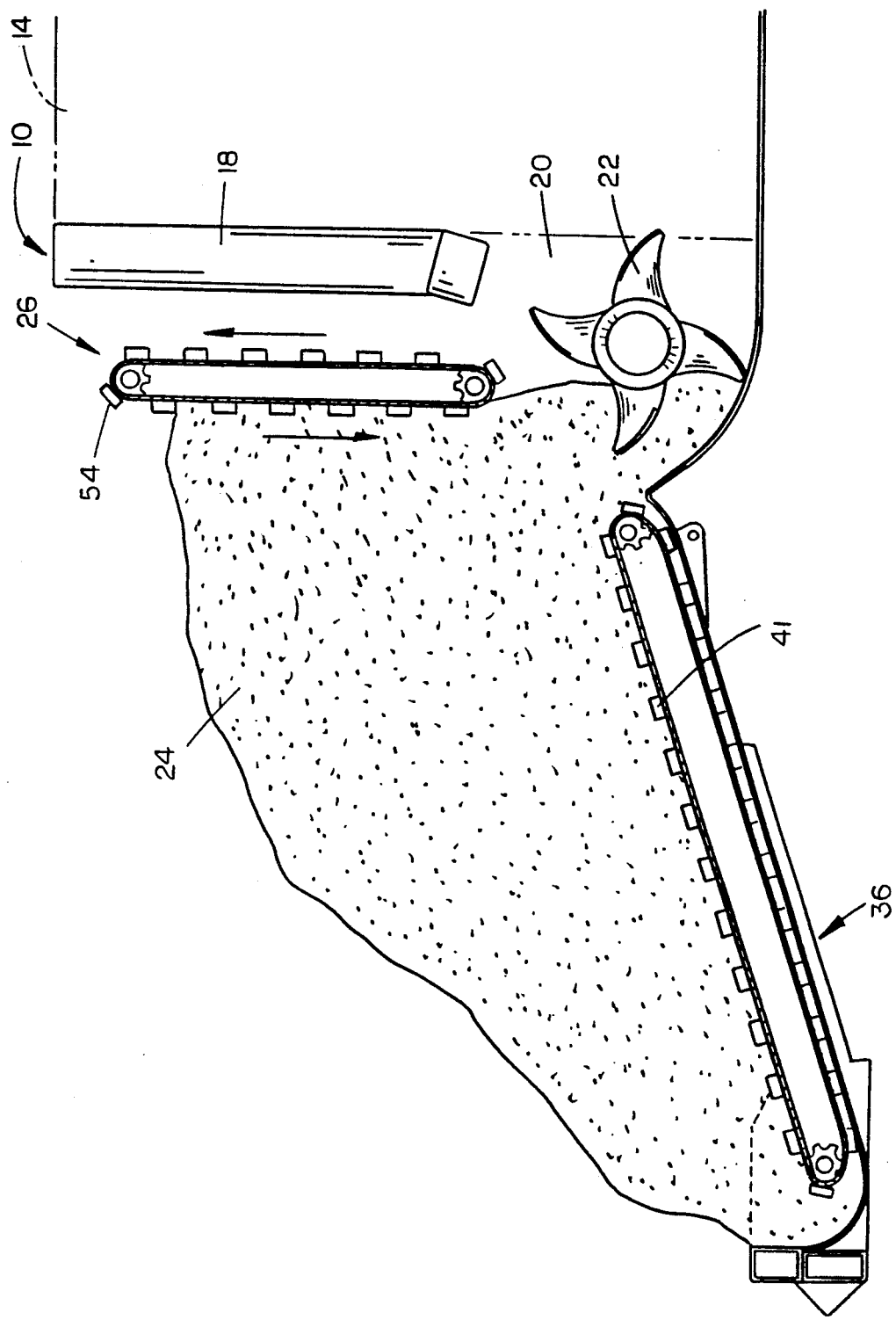
FIG. 3 is a sectional view of the bagging machine of this invention.

Chain feeder 26 is positioned above rotor 22 as best seen in FIG. 3 and includes a pair of chain assemblies 42 and 44 mounted on shafts 46 and 48 extending between the sides 30 and 32 as seen in the drawings. Chain assembly 44 is comprised of a pair of chains 50 and 52 having a plurality of closely-spaced slats 54 secured thereto and extending there between. Similarly, chain assembly 42 includes a plurality of closely-spaced slats 56. Panels 58 and 60 are provided in the chain assemblies 42 and 44 to prevent feed from passing therethrough.

In operation, the vertical chain feeder 26 is rotated in the direction of the arrows as illustrated in FIG. 3 so that the silage 24 is moved downwardly toward the rotor 22 so that the rotor is able to convey the silage into the tunnel 14. The slats 54 and 56 on the chain assemblies are much safer than the beater bars of the '805 patent since they do not have projections extending therefrom which could catch clothing or the like. Further the vertical chain feeder 26 of this invention does not create the dust problem associated with the prior art beater assemblies.

Thus, it can be seen that the invention accomplishes at least all of its stated objectives.

I claim:

1. An agriculture bagging machine for bagging material into agricultural bags comprising, a wheeled frame means having rearward and forward ends, a tunnel means having an intake end for receiving silage and an output end adapter to receive the mouth of an agricultural bag, a horizontally disposed rotor means at the intake end of said tunnel means for forcing silage into said tunnel means and into said bag, a hopper means on said wheeled frame means for receiving silage, said rotor means being in communication with said hopper means, and a substantially vertically disposed chain feeder means positioned in said hopper means, said chain feeder means being positioned above and upstream of said rotor means for moving silage downwardly in said hopper means toward said rotor means, said chain feeder means having a downstream lower end positioned closely adjacent said rotor means for moving silage downwardly into engagement with said rotor means.

2. An agricultural bagging machine for bagging material into agricultural bags comprising, a wheeled frame means having rearward and forward ends, a tunnel means having an intake end for receiving silage and an output end adapter to receive the mouth of an agricultural bag, a horizontally disposed rotor means at the intake end of said tunnel means for forcing silage into said tunnel means and into said bag;

a hopper means on said wheeled frame means for receiving silage with said hopper open to the atmosphere, said hopper means including:
- a generally vertical back wall having upper and lower ends, the lower end thereof positioned above the intake end of said tunnel means;
- a chain table extending forwardly from the intake end of said tunnel means, said chain table having forward and rearward ends; and
- a pair of opposing side walls extending between the back wall and the chain table;

said rotor means being in communication with said hopper means, and located below the lower end of said back wall and rearwardly of the rearward end of the chain table, a first substantially vertically disposed operable chain feeder means positioned in said hopper means, said first chain feeder means being positioned on said back wall directly above and upstream of said rotor means and operable to move silage downwardly in said hopper means toward said rotor means, and a second chain feeder means positioned on said chain table upstream of said rotor means and operable to move silage rearwardly toward said rotor means, said first and second chain feeder positioned in said hopper so as to converge toward said rotor means.

3. The machine of claim 2 wherein said first chain feeder means comprises a pair of vertically disposed chain assemblies, and wherein said second chain feeder means comprises a pair of chain assemblies.

* * * * *